Patented Jan. 3, 1928.

1,654,944

UNITED STATES PATENT OFFICE.

ALBERT ERNEST PENFOLD, REGINALD TRUESDALE, AND ROBERT CHARLES SMITH, OF BIRMINGHAM, ENGLAND, ASSIGNORS TO THE DUNLOP RUBBER COMPANY, LIMITED, OF BIRMINGHAM, ENGLAND, A BRITISH CORPORATION.

SUBSTITUTE FOR CATGUT AND SIMILAR ANIMAL PRODUCTS AND THE MANUFACTURE THEREOF.

No Drawing. Application filed March 16, 1927, Serial No. 175,919, and in Great Britain December 17, 1925.

This invention relates to the manufacture of a cord or string suitable as a substitute for gut and similar animal product such as is used for stringing racquets of the kind used for playing lawn tennis, badminton and other games. It is also equally suitable for garden and tennis nets, fishing lines and the like, or for strings for musical instruments.

According to this invention we form a cord or string of the type described by impregnating a number of threads of silk, ramie, cotton, wool, hemp, jute, artificial silk, or other fibres or fine threads with a solution of deresinated gutta percha or deresinated balata or both to which rubber may be added together with vulcanizing ingredients if desired. The threads are twisted together in a die immediately after or during the process of impregnation.

We are aware that finished goods have been passed through a bath of solution with the object of impregnating the same and they have been subsequently vulcanized but in such processes the impregnation cannot be so satisfactorily effected as in the processes according to our invention.

The said solution may be made up of the following ingredients.

| | Parts by weight. |
|---|---|
| Deresinated gutta percha | 75 |
| 1st grade plantation rubber | 20 |
| Sulphur | 5 |

If necessary a vulcanizing accelerator may be used such as light calcined magnesia. The above ingredients are combined with and agitated in a solvent such as toluene. The proportion of solvent added varies according to the viscosity of the solution required. Such proportions may be 25 parts of ingredients and 75 parts of solvent, both by weight.

As an alternative solution we may utilize:—

| | Parts by weight. |
|---|---|
| Deresinated gutta percha | 90 |
| Sulphur | 5 |
| Light calcined magnesia | 5 | prepared as aforesaid, but it will be understood that both the aforesaid solutions and the method of preparing them are given as examples only and that we do not limit ourselves to either the solutions or the method of preparing them.

For instance, it is desirable that both the given solutions should be vulcanized and we may prefer to utilize a gutta percha mixture capable of serving the required purpose without vulcanization.

After impregnation, the threads are twisted together and drawn through die boxes after which the solution may be vulcanized and dried by any known method.

Vulcanization and drying may be carried out by passing the cord through a chamber of suitable size, heated by warm air or other suitable means, at a suitable speed to ensure that the said cord is within the heated chamber for a sufficient period to achieve the desired end.

The threads, may, if desired, before vulcanization be given a further coating or coatings of solution after the threads are twisted together.

Further the improved gut may be coated, before or after vulcanization, with a suitable varnish to impart finish thereto.

It is, of course, understood that we may employ the fibres referred to either separately or one or more of them together in any proportions desired.

The cords may if desired be characterized by a composite construction, additional threads being twisted in the manner described around a central core or cord which also may be formed in the manner hereinbefore described.

It will be apparent that the said core may be constituted by any suitable attenuated material, for instance, so called catgut or again by wire which may be suitably braided or twisted if desired.

Having now particularly described and ascertained the nature of our said invention and in what manner the same is to be performed, we declare that what we claim is:—

The process of producing a string possessing characteristics enabling its substitution for gut, comprising individually impregnating separate strands in a solution containing a relatively large percentage of deresinated gutta-percha and a relatively small percentage of sulphur, the proportions being about fifteen to twenty-three percent deresinated gutta percha to one and one-half percent sulphur, by weight, then twisting the impregnated strands together and subjecting the twisted strands to pressure to form the single string of close cross section, and finally vulcanizing, drying and finishing the surface of the string to give it the characteristics first stated.

In witness whereof, we have hereunto signed our names.

ALBERT ERNEST PENFOLD.
REGINALD TRUESDALE.
ROBERT CHARLES SMITH.